United States Patent [19]

Greenberg

[11] Patent Number: 4,638,763

[45] Date of Patent: Jan. 27, 1987

[54] ANIMAL LITTER FORMULATION

[76] Inventor: Bernard Greenberg, 89-19 32nd Ave., E. Elmhurst, N.Y. 11369

[21] Appl. No.: 721,672

[22] Filed: Apr. 10, 1985

[51] Int. Cl.$^4$ .............................................. A01K 1/015
[52] U.S. Cl. ...................................................... 119/1
[58] Field of Search ............................................ 119/1

[56] References Cited

U.S. PATENT DOCUMENTS

| | | | |
|---|---|---|---|
| 3,029,783 | 4/1962 | Sawyer, Jr. et al. | 119/1 |
| 3,923,005 | 12/1975 | Fry et al. | 119/1 |
| 3,983,842 | 10/1976 | Marion et al. | 119/1 |

*Primary Examiner*—Hugh R. Chamblee

*Attorney, Agent, or Firm*—McAulay, Fields, Fisher, Goldstein & Nissen

[57] ABSTRACT

Anhydrous sodium sulfate is employed as an additive to animal litters formed from mineral, cellulosic, or chlorophyll-containing base materials. The amount of anhydrous sodium sulfate added is from approximately 0.5 to 4 parts for each 100 parts of the base material of the litter formulation. Additionally, an additive composition can include approximately 1 part citric acid for each 10 parts, by weight, of anhydrous sodium sulfate, approximately 1 part sodium chloride for each part of citric acid, by weight, and smaller amounts of activated carbon granules and germicidal agents.

9 Claims, No Drawings

ANIMAL LITTER FORMULATION

BACKGROUND OF THE INVENTION

Animal litters have been well known for many years. They are employed to absorb animal urine and to disperse animal feces until the litter is either cleaned or disposed of.

In the home, litters are frequently employed for cats and small dogs. It is neither desirable nor economic to constantly dispose of the litter when it has become contaminated with the animal urine or feces which it is meant to contain. Rather, the feces is scooped from the litter employing a litter sieving spoon.

The sieving-cleaning operation would be even more effective if the litter were to contain an additive which, upon being contacted by the urine would absorb the urine and form a deposit of sufficient size and strength to be removed by the sieving spoon along with the feces.

Obviously, the litter should also contain other materials which are frequently added as additives including bactericides, ammonia binding agents, extenders for such agents, etc., along with, of course, the litter base, such as clay.

SUMMARY OF THE INVENTION

In accordance with the present invention, it has unexpectedly been discovered that the addition of anhydrous sodium sulfate to an animal litter formulation provides for rapid and complete absorption of the animal urine, the sodium sulfate being converted to its decahydrate. Further, because the decahydrate is a solid which tends to agglomerate into crust-like masses, when the litter is cleaned with the sieving spoon, the spent sodium sulfate can also be removed, along with the urine it has absorbed.

Because sodium sulfate is a relatively inexpensive material, it is a reasonable material for addition to an animal litter formulation.

In addition to the anhydrous sodium sulfate employed as an additive to the animal litter, the composition may also contain other additive materials for purposes known in the art, or to be described. Such additional materials can include citric acid, sodium chloride, activated carbon granules, and benzalkonium chloride.

While the base for the animal litter in accordance with the present invention is generally a clay material, other materials can also be employed, such as peanut hulls, green plant powder, alfalfa, or other cellulosic materials or chlorophyll-containing materials, including sawdust.

DESCRIPTION OF THE PREFERRED EMBODIMENTS

In accordance with the present invention, the primary component of the animal litter is a mineral material including alumino-silicates, such as clays. Included within this definition are such materials as kaolinite, halloysite, attapulgite, montmorillonite, vermiculite, hectorite, etc. Other mineral materials which can be employed include silica, limestone, alumina, etc. Further, the base of the animal litter can be a cellulosic or chlorophyll-containing material, such as sawdust or ground alfalfa.

So long as the only function of the animal litter is to disperse animal feces, any of the materials described above can be employed. However, to provide an effective animal litter, certain additives are required.

In accordance with the present invention, the primary additive to the litter base is anhydrous sodium sulfate. The amount of anhydrous sodium sulfate added, based upon the amount of litter base, is from 0.5 to 4 parts, preferably from 2.5 to 3.5 parts of anhydrous sodium sulfate per 100 parts of the animal litter base.

The purpose of the anhydrous sodium sulfate addition is to allow a crust-like mass to be formed in the litter upon absorption of animal urine. When anhydrous sodium sulfate is employed, it absorbs approximately 125% of its own weight in water, the primary constituent of the urine, the water binding capacity of the anhydrous sodium sulfate being among the highest water binding capacities known among the various components. The decahydrate which is formed from this water binding tends to form into crust-like masses which are several square inches in area allowing easy removal by the aforementioned sieving spoon. These crusts do not adhere to the normally employed thermoplastic litter pans, thus making their removal easy. However, if desired, the crusts can be allowed to collect at the bottom of the litter pan until the entire litter is disposed of.

When employing a dehydrating agent, such as anhydrous sodium sulfate, it is important that the dehydrating action not be so intense that atmospheric moisture is absorbed, thus resulting in a loss of efficacy as the material is used. The standard free energy of formation of the sodium sulfate decahydrate from water and the anhydrous material is one kcal. per mole, negative; this is, thus, only $-100$ cal. per mole of water captured. The low value indicates that the water vapor tension over the anhydrous sodium sulfate is 16.6 torr, or 93% relative humidity. By contrast, calcium chloride has a vapor tension of 5.6 torr, a 32% relative humidity, so that it would absorb atmospheric moisture, and, thus, not be useful as a litter additive in accordance with the present invention.

The anhydrous sodium sulfate additive of the present invention has additional advantages. It is not known to have any toxic or environmentally negative aspects. This is not necessarily true of other additives which have been suggested for animal litters. In addition to the anhydrous sodium sulfate, as indicated, other materials can also be employed. Based upon 100 parts of the anhydrous sodium sulfate as a additive, approximately 10 parts of citric acid can be used. This citric acid is employed, particularly, to retard the liberation of ammonia which is normally released based upon bacterial action on excreted urea, a prime component of urine. This tribasic, hydroxylated material bonds any ammonia to the substrate, or base, of the litter. In order to extend the capability of the citric acid, which is relatively more expensive, sodium chloride in an amount of approximately 1:1, by weight, based on the citric acid, is added. This sodium chloride not only extends the action of the citric acid, but also shows certain anti-microbial characteristics.

While the anhydrous sodium sulfate of the present invention is superior in absorbing urine which is excreted into the litter, and even when the citric acid retards generation of ammonia, bacterial action cannot be entirely prevented. As a consequence, small quantities of a germicidal agent, such as benzalkonium chloride are employed in small, but effective amounts to prevent bacterial action on the waste products placed into the litter. The amount of benzalkonium chloride can be approximately 0.01%, based upon the total weight of the litter additive.

In addition to the above, a small quantity of activated carbon granules, such as approximately 2%, by weight, based upon the total litter additive composition, can also be employed. The purpose of the activated carbon granules is to absorb the odor producing substances which form part of, or are generated by, the feces and urine materials found in the litter.

While various alkaline earth and other salts of strong mineral acids have been shown in the prior art, none of these materials serve the same function as the anhydrous sodium sulfate of the present invention, nor do any of these prior art references suggest the use of the anhydrous sodirar sulfate. For example, U.S. Pat. No. 3,029,783, Sawyer, Jr., shows aluminum sulfate: U.S. Pat. No. 3,923,005, Fry et al, shows sodium phosphate: and U.S. Pat. No. 3,983,842, Marion et al, shows various sodium salts, none of which include the sulfate. Further, none of the disclosed materials provide the advantages of the sodium sulfate anhydrate, particularly the capacity to absorb more than its own weight in water and bind it tightly.

When a five pound charge of clay, with the additive compositions of the present invention, is employed, approximately 50 cc of urine can be absorbed per day. This is approximately the amount which will be generated by three cats in a single day. The entire litter need not be discarded after the additive composition is exhausted. Rather, after scooping the crusts from the litter composition, if that is the desired operation, a further addition of the additive composition, including the anhydrous sodium sulfate and other materials, can be added in the same amount. The base material of the litter can be used through five to seven cycles of removal and readdition without discernable odor.

The following are examples of compositions incorporating the present invention. All parts in these examples are by weight, unless otherwise indicated:

EXAMPLE 1

A suitable composition, employing the additives of the present invention, is based upon approximately 2.25 kg. of clay. To this is added:
56.7 g. anhydrous sodium sulfate
5 g. citric acid
5 g. sodium chloride
1.5 g. activated carbon
0.01 g. benzalkonium chloride After generation of crusts caused by the entry of animal urine into the litter composition, the composition just described could be readded and removal repeated for up to 7 cycles.

EXAMPLE 2

Employing as a base material approximately 1.35 kg. of sawdust, an effective litter was produced using the following additive composition:
42.5 g. anhydrous sodium sulfate
4 g. citric acid
4 g. sodium chloride
1 g. activated carbon
0.008 g. benzalkonium chloride As crusts are formed in this litter through cat urine being placed in it, and the crusts are removed, additional additive compositions in the same amount could be added allowing reuse for up to 7 cycles.

While specific embodiments of the invention have been shown and described, the invention should not be considered as so limited, but only as limited by the appended claims:

I claim:

1. In a litter for accumulation of animal feces and urine, the improvement comprising the addition to the base material of the litter of an effective amount of anhydrous sodium sulfate.

2. The litter composition of claim 1 wherein the base material is a clay.

3. The litter composition of claim 1 wherein the amount of sodium sulfate added is from 0.5 to 4 parts per 100 parts of base material.

4. The litter composition of claim 3 wherein the amount of sodium sulfate is from 2.5 to 3.5 parts per 100 parts of the base material.

5. The litter composition of claim 1 having, in addition, approximately 1 part of citric acid for each 10 parts, by weight, of anhydrous sodium sulfate.

6. The composition of claim 4 having, in addition, approximately 1 part of sodium chloride for each part of citric acid, by weight.

7. The litter composition of claim 1 having, in addition, approximately 2%, by weight, based upon the anhydrous sodium sulfate of activated carbon granules.

8. The litter composition of claim 1 having small, but effective, amounts of benzalkonium chloride.

9. The litter composition of claim 1 wherein the base material is a cellulosic material.

* * * * *